US012187216B1

(12) United States Patent
Treglown

(10) Patent No.: US 12,187,216 B1
(45) Date of Patent: Jan. 7, 2025

(54) KNEE AIRBAG FOR A VEHICLE

(71) Applicant: Autoliv ASP, Inc., Ogden, UT (US)

(72) Inventor: Aaron Treglown, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 18/372,728

(22) Filed: Sep. 26, 2023

(51) Int. Cl.
*B60R 21/206* (2011.01)
*B60R 21/2338* (2011.01)
*B60R 21/231* (2011.01)
*B60R 21/233* (2006.01)
*B60R 21/235* (2006.01)

(52) U.S. Cl.
CPC .. *B60R 21/206* (2013.01); *B60R 2021/23169* (2013.01); *B60R 2021/23308* (2013.01); *B60R 2021/23382* (2013.01); *B60R 2021/23547* (2013.01)

(58) Field of Classification Search
CPC .......... B60R 2021/23169; B60R 2021/23547; B60R 2021/23382; B60R 2021/0051; B60R 2021/0053; B60R 2021/23308; B60R 2021/23316; B60R 2021/23324; B60R 21/231; B60R 21/2346; B60R 21/235; B60R 21/206; B60R 21/233; B60R 21/2338; B60R 21/205
USPC .................................. 280/730.1, 732, 743.2
See application file for complete search history.

(56) References Cited

U.S. PATENT DOCUMENTS 6,382,662 B1  5/2002 Igawa
8,746,734 B1  6/2014 Smith et al.
9,592,787 B2  3/2017 Jung et al.
(Continued)

FOREIGN PATENT DOCUMENTS

CN  114043959 A  2/2022
DE  60305374 T2 * 5/2007 ........... B60R 21/206
(Continued)

OTHER PUBLICATIONS

U.S. Appl. No. 18/372,728, filed Sep. 26, 2023.
(Continued)

*Primary Examiner* — Keith J Frisby
(74) *Attorney, Agent, or Firm* — Harness, Dickey & Pierce, P.L.C.; Stephen T. Olson

(57) ABSTRACT

A knee airbag includes a front panel, a rear panel coupled to the front panel to define an inflation chamber, and an intermediate panel between the front panel and the rear panel and within the inflation chamber. The intermediate panel is connected to the front panel and the rear panel at various locations between a proximal end and a distal end of the intermediate panel to control an inflated configuration of the knee airbag. The knee airbag has a two-layer construction only including the front panel and the rear panel in a depth direction, a three-layer construction including the front panel, the rear panel, and the intermediate panel in the depth direction, and a transition construction including the front panel, the rear panel, and an air permeable portion in the depth direction. The knee airbag includes the two-layer construction in at least first and second two-layer areas that extend at least substantially along first and second lateral sides of the knee airbag. The knee airbag includes the three-layer construction in a laterally central area between the first and second lateral sides.

14 Claims, 5 Drawing Sheets

(56) References Cited

U.S. PATENT DOCUMENTS

| | | |
|---|---|---|
| 9,944,248 B2 * | 4/2018 | Rahman ............... B60R 21/233 |
| 2005/0253367 A1 * | 11/2005 | Heigl ................. B60R 21/2346 |
| | | 280/730.2 |
| 2007/0145730 A1 | 6/2007 | Choi |
| 2007/0222189 A1 | 9/2007 | Baumbach et al. |
| 2010/0253051 A1 | 10/2010 | Moritani |
| 2011/0095512 A1 | 4/2011 | Mendez |
| 2014/0291972 A1 | 10/2014 | Fukawatase et al. |
| 2016/0002831 A1 | 1/2016 | Becker et al. |
| 2017/0136874 A1 | 5/2017 | Harris et al. |
| 2020/0276953 A1 | 9/2020 | Enders |
| 2022/0055568 A1 | 2/2022 | Ruffner, II et al. |
| 2022/0097642 A1 * | 3/2022 | Albiez ................... B32B 5/263 |

FOREIGN PATENT DOCUMENTS

| | | | |
|---|---|---|---|
| DE | 102016001918 A1 | 8/2017 | |
| DE | 102019109901 A1 * | 10/2020 | ........... B60R 21/231 |
| JP | 2005186886 A | 7/2005 | |
| JP | 4954003 B2 | 6/2012 | |
| WO | 2009054260 A1 | 4/2009 | |
| WO | 2017140521 A1 | 8/2017 | |
| WO | 2023066623 A1 | 4/2023 | |
| WO | 2023/135263 A1 | 7/2023 | |
| WO | WO-2024038040 A1 * | 2/2024 | |

OTHER PUBLICATIONS

International Search Report and Written Opinion of the ISA issued in PCT/US2024/013972, mailed May 14, 2024; ISA/US.

ALBIEZ , Airbag With at Least Three Layers, Said Airbag Being Woven Into a Part, Apr. 27, 2023, EPO, WO 2023066623 A 1, Machine Translation of Description (Year: 2023).

International Search Report and Written Opinion of the ISA issued in PCT/US2024/039509, mailed Oct. 1, 2024; ISA/EP.

* cited by examiner

KNEE AIRBAG FOR A VEHICLE

FIELD

The present disclosure generally concerns inflatable occupant restraint systems for vehicles. More particularly and according to one specific application, the present disclosure relates to a knee airbag arrangement for a vehicle.

BACKGROUND

This section provides background information related to the present disclosure which is not necessarily prior art.

Inflatable occupant restraints or airbags are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components.

In the event of an accident or impending accident, a sensor within the vehicle measures abnormal deceleration, for example, the airbag is triggered to inflate within a few milliseconds with gas produced by a device commonly referred to as an "inflator". The inflated airbag cushions the vehicle occupant from impact forces.

Inflatable occupant restraint systems may include a knee airbag arrangement for protecting the knees and/or lower legs of an occupant during a collision event. Such knee airbag arrangements generally include an inflatable knee airbag for absorbing at least a portion of the impact energy otherwise directed to an occupant's knees and lower legs during a collision event, especially by restraining the occupant by limiting forward movement of the knees and lower legs.

One suitable knee airbag arrangement is shown and described is commonly assigned U.S. Pat. No. 9,592,787 (the '787 patent). The '787 patent discloses a knee airbag arrangement having an inflatable cushion configured and arranged to rapidly deploy between the knees of a passenger and an instrument panel of the vehicle. The inflatable cushion of the knee airbag arrangement includes a front panel, a rear panel coupled to the front panel, and a hinge portion having a thin inflation section at a position corresponding to a housing connecting portion. The inflatable cushion is connected to a housing connection portion at the hinge portion upon inflation. The '787 patent is incorporated by reference as if fully set forth herein.

Another suitable air knee airbag arrangement is shown and described is commonly assigned U.S. Ser. No. 18/107,332, filed Feb. 8, 2023 (the '332 application). The '332 application discloses a knee airbag arrangement having a front panel, a rear panel coupled to the front panel to define an inflation chamber, and an intermediate panel between the front panel and the rear panel and within the inflation chamber. The intermediate panel is connected to the front panel and the rear panel at various locations between a proximal end and a distal end of the intermediate panel to control an inflated configuration of the knee airbag. First and second suspension portions suspend the proximal end of the intermediate panel between the front panel and the rear panel and permeable to the passage of inflation gases. The first suspension portion extends between the front panel and the proximal end of the intermediate panel. The second suspension portion extends between the rear panel and the proximal end of the intermediate panel. An inflator for inflating the knee airbag is disposed in the inflation chamber at a proximal end of the knee airbag. An inflation gas diffusing arrangement is disposed in the inflation chamber between the inflator and the proximal end of the intermediate panel. The '332 application is incorporated by reference as if fully set forth herein.

While known occupant restraint systems including a knee airbag arrangement such as the knee airbag arrangement shown and described in the '787 patent and the '332 application have proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide a knee airbag that that more easily directs inflation gases to a distal end of the knee airbag.

In accordance with one particular aspect, the present teachings provide a knee airbag for a vehicle. The knee airbag includes a front panel, a rear panel coupled to the front panel to define an inflation chamber, and an intermediate panel between the front panel and the rear panel and within the inflation chamber. The intermediate panel is connected to the front panel and the rear panel at various locations between a proximal end and a distal end of the intermediate panel to control an inflated configuration of the knee airbag. The knee airbag has a two-layer construction including only the front panel and the rear panel in a depth direction, a three-layer construction including the front panel, the rear panel, and the intermediate panel in the depth direction, and a transition construction including the front panel, the rear panel, and an air permeable portion in the depth direction. The knee airbag includes the two-layer construction in at least first and second two-layer areas that extend at least substantially along first and second lateral sides of the knee airbag. The knee airbag includes the three-layer construction in a laterally central area between the first and second lateral sides.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance and does not necessarily mean special or preferred.

In the following description, directional terms such as upper direction, lower direction, forward direction, rearward direction, and the like will be defined based on a knee airbag in a state that an associated airbag housing is coupled to a lower portion of an instrument panel. That is, a direction toward the roof of a vehicle is defined as an upper direction (U), a direction toward the bottom of the vehicle is defined as a lower direction (L), a direction toward a passenger is defined as a rearward direction (R), and a direction toward a front of the vehicle is defined as a forward direction (F). The terms distal and proximal used to describe the knee airbag or elements thereof shall be understood to be with reference to a deployed orientation of the knee airbag. Explaining further, the term distal refers to being at or toward the end of the knee airbag at the housing and the term proximal refers to being at or toward the end of the knee airbag opposite the housing.

Figure 1:
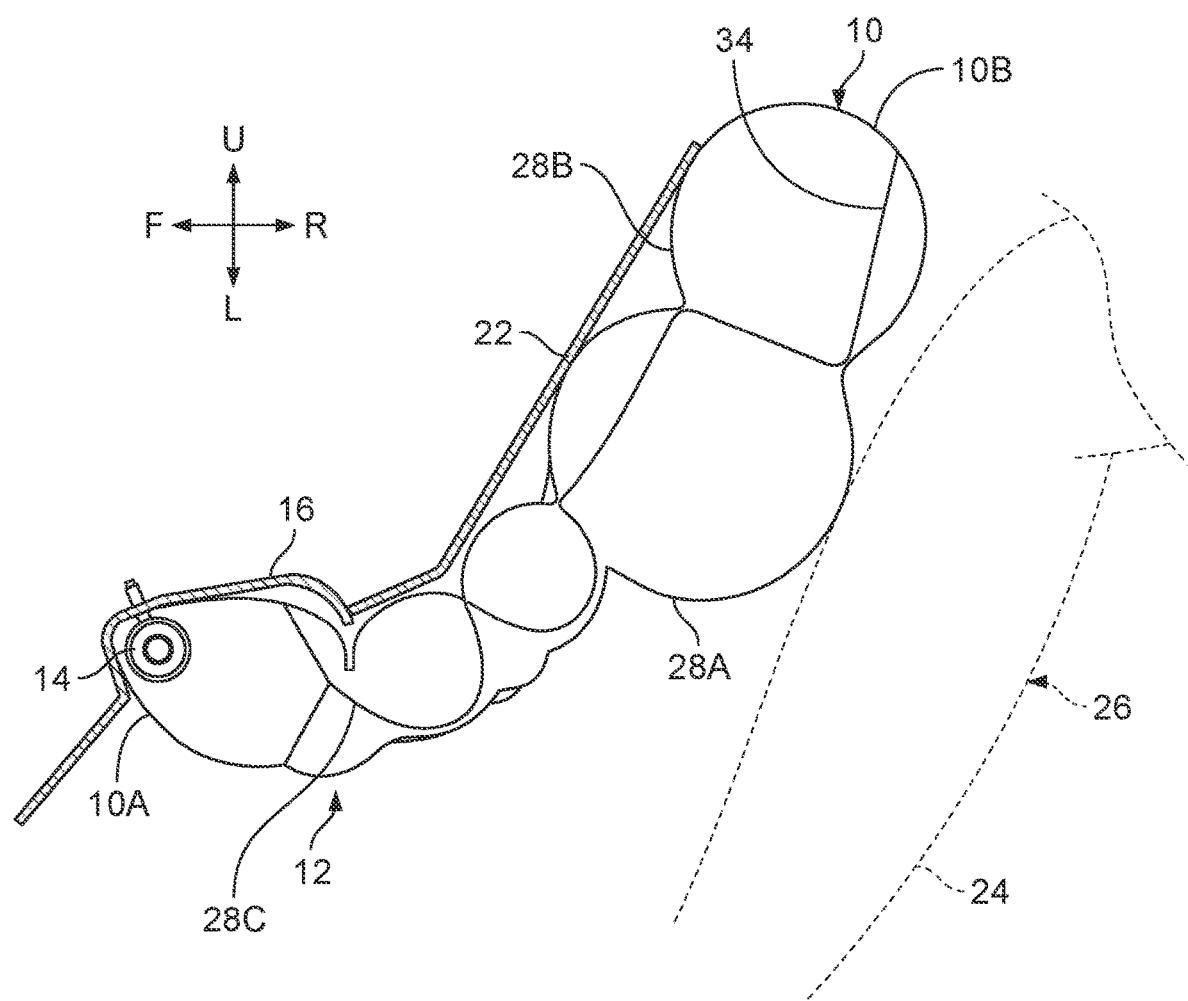
FIG. 1 is a side view of a knee airbag for a vehicle in accordance with the present teachings, the knee airbag shown inflated and operatively disposed between the knees of a passenger and an instrument panel of the vehicle.
Figure 2:
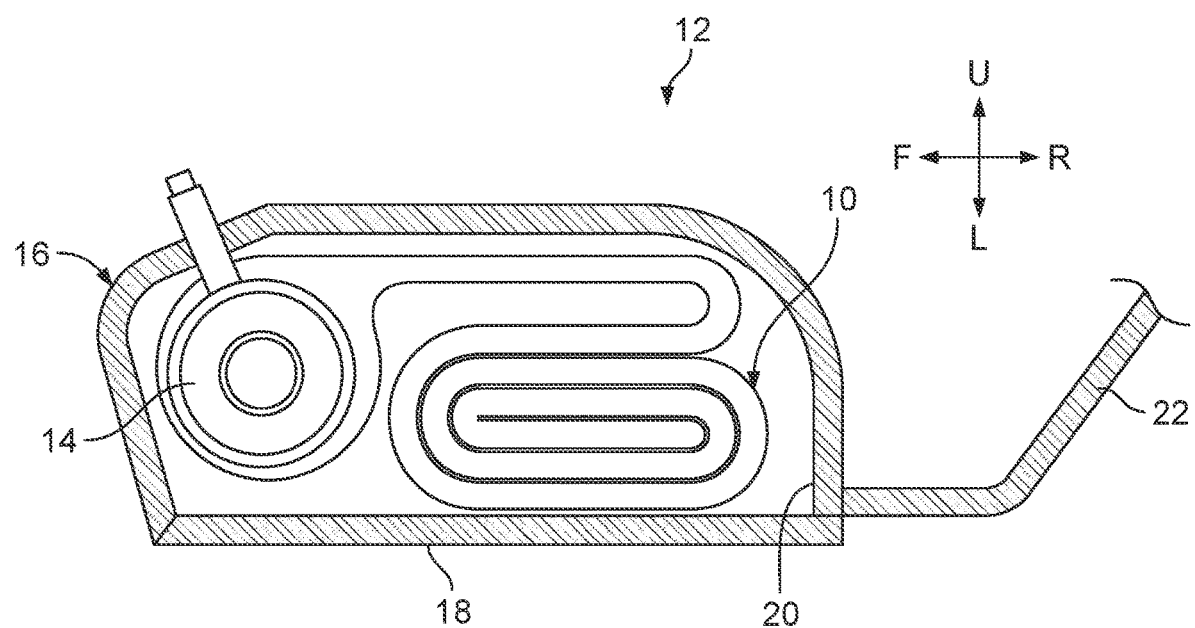
FIG. 2 is longitudinal cross-sectional view of the knee airbag of FIG. 1, the knee airbag shown prior to deployment within an airbag housing, and operatively associated with an inflator.

With particular reference to the environmental views of FIGS. 1 and 2, a knee airbag for a vehicle in accordance with the present teachings is illustrated and generally identified at reference character 10. The knee airbag 10 is shown incorporated into a knee airbag arrangement 12 that further includes an inflator 14 for supplying inflation gases to the knee airbag 10 upon sensing of predetermined collision events, and an airbag housing 16 receiving the knee airbag 10 and the inflator 14. The airbag housing 16 includes a door 18 normally covering an opening 20 of the airbag housing 16. The knee airbag arrangement 12 is installed within the vehicle at a lower portion of an instrument panel 22. Upon deployment, the knee airbag 10 is operatively disposed in a longitudinal direction (e.g., in a F to R direction) between the knees 24 of a passenger 26 and the instrument panel 22 of the vehicle.

Figure 4:
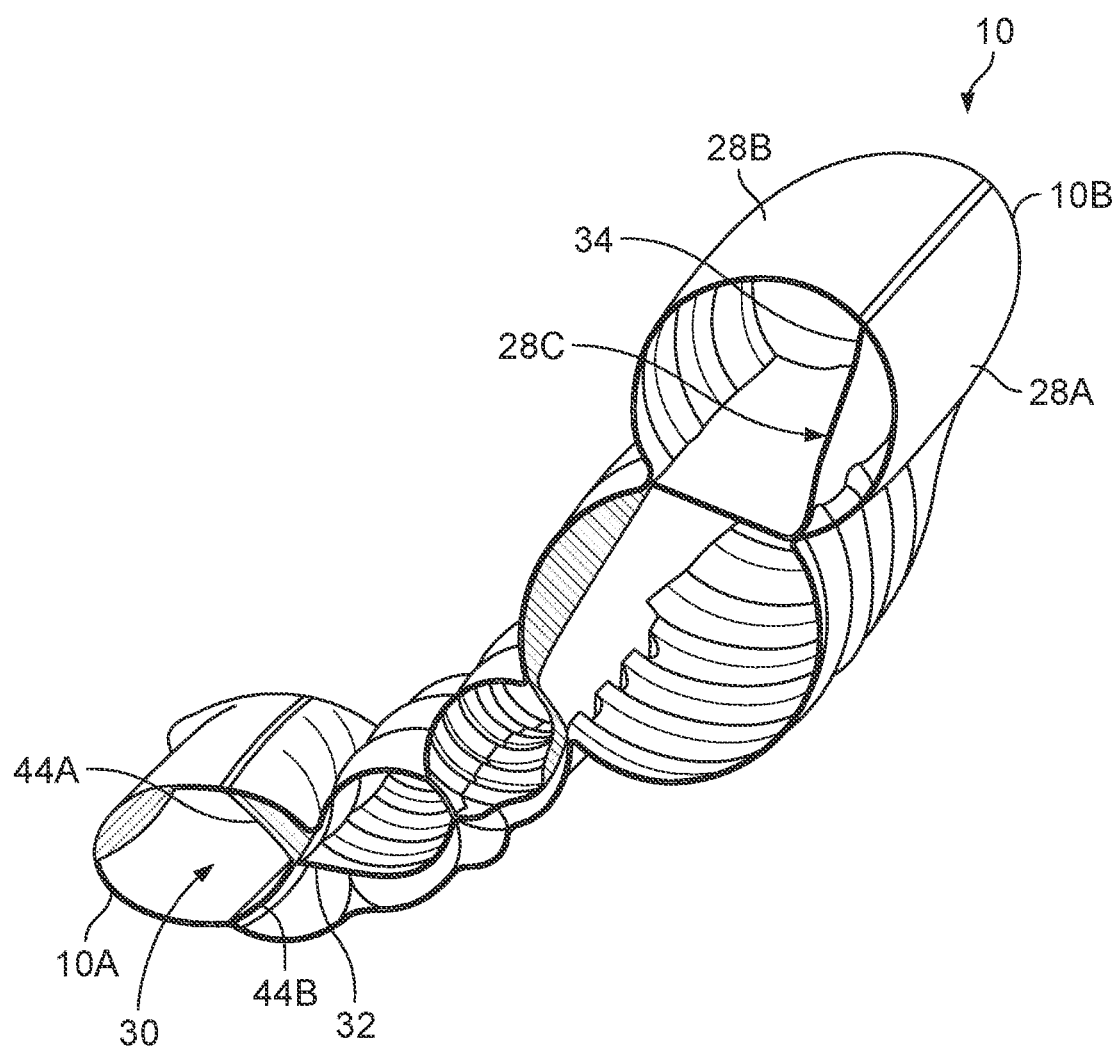
FIG. 4 is a sectional view of the knee airbag of the present teachings.

With continued reference to the environmental views of FIGS. 1 and 2 and additional reference to the remaining figures, the details of the knee airbag 10 of the present teachings will be further described. The knee airbag 10 is shown to generally include a first panel 28A, a second panel 28B and a third panel 28C. In the embodiment illustrated, the first panel is a front panel 28A, the second panel is a rear panel 28B, and the third panel is an intermediate panel 28C. As will become more clear below, the intermediate panel 28C cooperates with front and rear panels 28A and 28B to define a desired deployment shape of the knee airbag 10. As shown in the simplified cross-sectional view of FIG. 4, the intermediate panel 28C is disposed in the inflation chamber 30, extends at least substantially across the inflation chamber 30 in an airbag lateral direction $L_1$, and at various locations between a proximal end 32 and a distal end 34 of the intermediate panel 28C is attached to both the front panel 28A and the rear panel 28B.

When the front and rear panels 28A and 28B are internally connected with the intermediate panel 28C, a predetermined deployment profile or shape is defined. It will be understood that the particular deployment profile shown in the drawings and the corresponding attachment locations between the intermediate panel 28C and the upper panel 28A, and the corresponding attachment locations between the intermediate panel 28C and the lower panel 28B are merely exemplary insofar as the present teachings are concerned. The particular attachment locations between the panels 28A-28C between the upper panel 28A and the lower panel 28B cooperate to define an airbag shape that unfolds and deploys between the knees 24 of the passenger 26 and the instrument panel 22 of the vehicle to protect the passenger 26.

Figure 3:
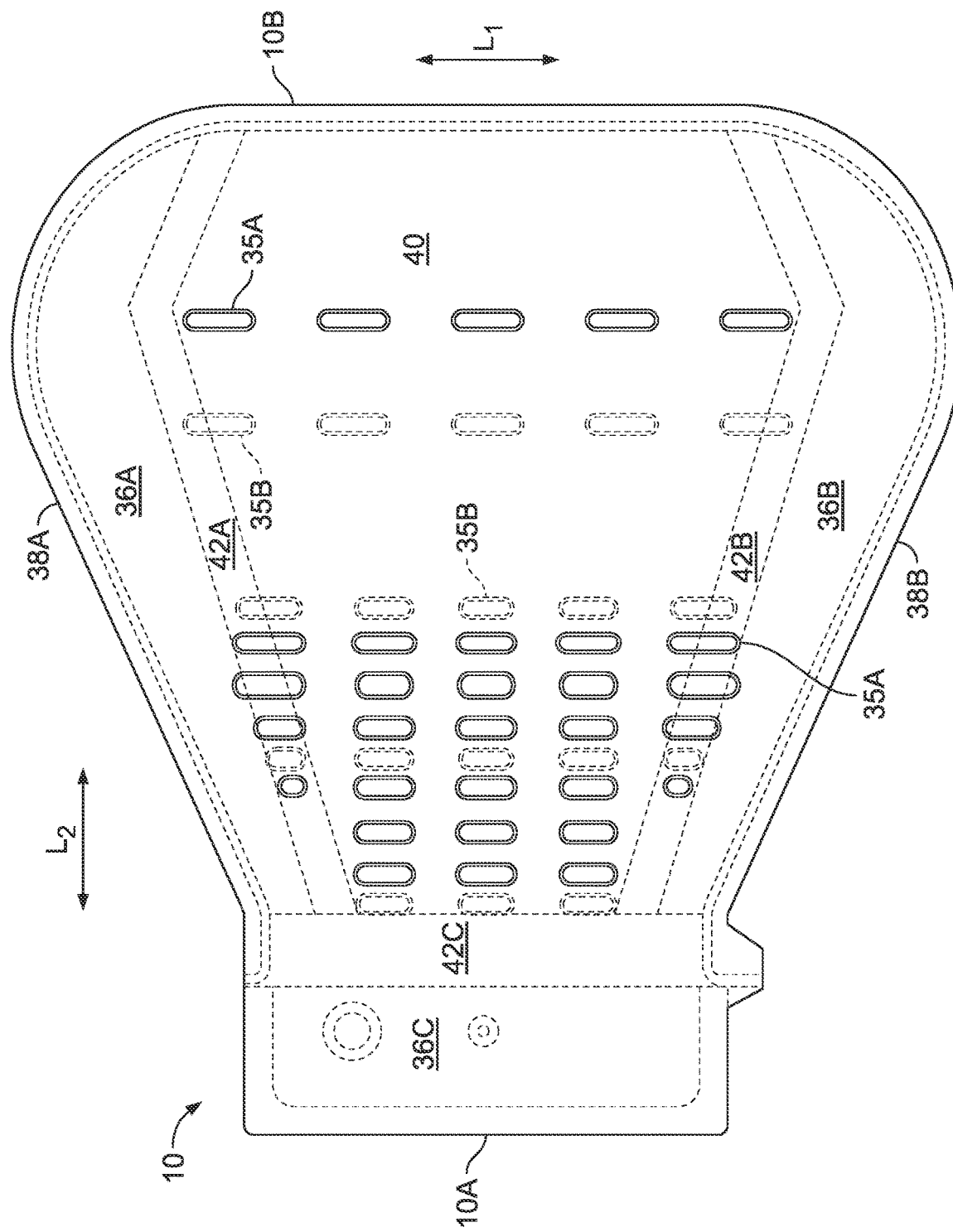
FIG. 3 is a front view of the knee airbag in accordance with the present teachings.

As shown in the drawings, the attachment locations between the panels 28A-28C include first attachment locations 35A that connect the front panel 28A and the intermediate panel 28C and includes second attachment locations 35B that connect the rear panel 28B and the intermediate panel 28C. The first attachment locations 35A (shown in solid lines in FIG. 3) and the second attachment locations 35B (shown in dashed lines FIG. 3) are arranged in rows extending in the lateral direction $L_1$ across the airbag 10. The rows of either first attachment locations 35A or second attachment locations 35B are spaced apart from one another in the longitudinal direction $L_2$.

In different areas, the knee airbag 10 has a two-layer construction including only the front panel 28A and the rear panel 28B in a depth direction (i.e., perpendicular to the lateral direction $L_1$ and the longitudinal direction $L_2$), a three-layer construction including the front panel 28A, the rear panel 28B, and the intermediate panel 28C in the depth direction, and a transition construction including the front panel 28A, the rear panel 28B, and an air permeable portion in the depth direction. As will be discussed below, the air permeable portion may include both weft threads and warp threads that are not interwoven with one another. In the embodiment illustrated, the airbag 10 includes the two-layer construction in at least first and second two-layer areas 36A and 36B at least substantially extending along first and second lateral sides 38A and 38B of the knee airbag 10. As shown, the first and second two layer areas 38A and 38B may extend completely to the distal end 10B of the airbag 10.

The knee airbag 10 includes the three-layer construction in a laterally central area 40 laterally between the first and second lateral sides 38A and 38B.

The knee airbag 10 includes the transition construction in first and second transition areas 42A and 42B laterally between the first two-layer area 36A and the laterally central area 40 and the second two-layer area 38B and the laterally central area 40, respectively. As will become more clear below, the transition areas 42A and 42B function to laterally suspend the intermediate panel 28C within the inflation cavity 30 and are air permeable to allow for the flow of inflation gases therethrough. Between the front and rear panels 28A and 28B in the depth direction, the first and second transition areas 42A and 42B include both warp and weft threads defining an inner OPW layer. Importantly, however, these warp and weft threads are not woven together in the first and second transition areas 42A and 42B. The weft threads continue laterally through the first and second transition areas 42A and 42B to support the intermediate panel 28C and continue at the intermediate panel 28C where they are interwoven with warp threads to define the intermediate panel 28C. Because the warp and weft threads of the first and second transition areas 42A and 42B are not woven together, the first and second transition areas 42A and 42B are permeable to the passage of inflation gases.

The weft threads are arranged in a first group of weft threads 43A extending from the front panel 28A to the intermediate panel 28C and a second group of weft threads 43B extending from the rear panel 28B to the intermediate panel 28C. The transition construction in first and second transition areas 42A and 42B thereby suspend the intermediate panel 28C between the front panel 28A and the rear panel 28B while being permeable to the passage of inflation gases. The additional warp threads are shown running perpendicular to the weft threads 43A and 43B. These additional warp threads are spaced from the weft threads 43A and 43B and are not interwoven with the weft threads 43A and 43B.

The knee airbag 10 may further include a further two-layer area 36C at the proximal end 10A thereof and a further transition area 42C longitudinally between the further two-layer area 36C and the laterally central area 40. The further transition area 42C may include first and second suspension portions 44A and 44B suspending the proximal end of the intermediate panel 28C between the front panel 28A and the rear panel 28B. The first and second suspension portions 44A and 44B are permeable to the passage of inflation gases for inflating the knee airbag 10 from a proximal end 10A of the airbag 10 to a distal end 10B of the airbag 10 and cooperate to suspend the proximal end 32 of the intermediate panel 28C within the inflation cavity 30 such that the proximal end 32 of the intermediate panel 28C "floats" between the front panel 28A and the rear panel 28B. The first suspension portion 44A extends between the front panel 28A and the proximal end 32 of the intermediate panel 28A. The second suspension portion 44B extends between the rear panel 28B and the proximal end 32 of the intermediate panel 28C.

In one particular application, the knee airbag 10 of the present teachings may be a one piece woven (OPW) airbag 10. In such an example, the front panel 28A, the rear panel 28B and the intermediate panel 28C may be formed by weaving using OPW technology. In such an example, the first and second transition areas 42A and 42B may be formed with the front panel 28A, the rear panel 28B and the intermediate panel 28C using OPW technology. The front and rear panels 28A and 28B may be conventionally formed with the OPW technology to include weft and warp threads. The weft threads extend in the lateral direction $L_1$ across the knee airbag 10 and the warp threads extend in the longitudinal direction $L_2$ perpendicular to the weft threads extending from the proximal end 10A of the airbag 10 to the distal end 10B of the airbag 10. In a known manner, the weft and warp threads of the front panel 28A are interwoven with the weft and warp threads of the rear panel 28B at a perimeter of the knee airbag 10 to seal or close the inflation chamber 30. The warp threads extend in a machine direction and the weft threads extend in a direction perpendicular to the machine direction. In the embodiment illustrated, each fabric layer 28A, 28B, and 28C is created by weaving at least 2 sets of warp threads and 1 set of weft threads. Thus, 3-layer OPW uses at least 6 sets of warp threads and 3 sets of weft threads. Warp threads extend the entire length of the airbag 10, but weft threads may be excluded from a portion of the airbag 10.

Figure 5:
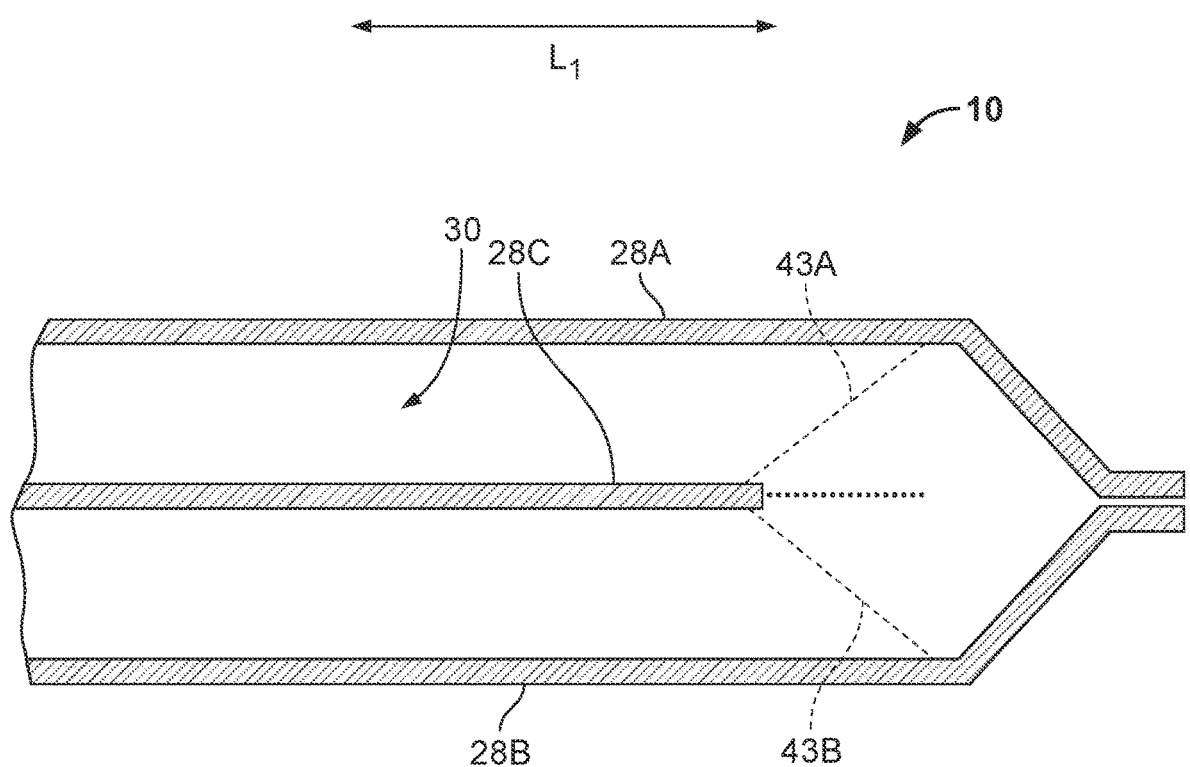
FIG. 5 is another sectional view taken through a lateral portion of the knee airbag.

The first and second transition areas 42A and 42B may be integrally formed with the front panel 28A, the rear panel 28B and the intermediate panel 28C using OPW technology. In one particular embodiment, the first and second transition areas 42A and 42B may be formed of first and second pluralities of additional weft threads of the OPW knee airbag 10, respectively. The first plurality of additional weft threads may be interwoven with the warp and weft threads of the front panel 28A in the first and second two-layer areas 42A and 42B and may laterally extend from the front panel 28A to the intermediate panel 28C, as shown in FIG. 5). Similarly, the second plurality of additional weft threads may be interwoven with the warp and weft threads of the rear panel 28B in the first and second two-layer areas 42A and 42B and extend laterally to the intermediate panel 28C.

The first and second suspension portions 44A and 44B may also be formed with the front panel 28A, the rear panel 28B and the intermediate panel 28C using OPW technology. The first and second suspension portions 44A and 44B may be formed of warp threads without weft threads. A first plurality of these warp threads may longitudinally extend from the front panel 28A to the intermediate panel 28C. Similarly, a second plurality of warp threads may longitudinally extend from the rear panel 28B to the intermediate panel 28C.

Deployment of the knee airbag 10 occurs in response to activation of the inflator 14. The inflator 14 activates in response to a sensed condition indicating a predetermined vehicle collision or event. The inflator 14, its activation, and the sensing of the vehicle collision or event will be understood to be conventional insofar as the present teachings are concerned. The inflator 14 delivers inflation gases through the holes 10 of the diffuser panel to inflate the knee airbag 10.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A knee airbag comprising:
   a front panel;
   a rear panel coupled to the front panel to define an inflation chamber;

an intermediate panel between the front panel and the rear panel and within the inflation chamber, the intermediate panel connected to the front panel and the rear panel at various locations between a proximal end and a distal end of the intermediate panel to control an inflated configuration of the knee airbag, wherein the knee airbag has a two-layer construction including only the front panel and the rear panel in a depth direction, a three-layer construction including the front panel, the rear panel, and the intermediate panel in the depth direction, and a transition construction including the front panel, the rear panel, and an air permeable portion in the depth direction, and wherein the knee airbag includes the two-layer construction in at least first and second two-layer areas at least substantially extending along first and second lateral sides of the knee airbag, respectively, the knee airbag includes the three-layer construction in a laterally central area between the first and second lateral sides.

2. The knee airbag of claim 1, further comprising the transition construction in first and second transition areas laterally between the first two-layer area and the laterally central area and the second two-layer area and the laterally central area, respectively.

3. The knee airbag of claim 2, wherein between the front and rear panels, the transition construction in first and second transition areas includes warp threads and weft threads that are not interwoven with one another, the weft threads of the first and second transition areas laterally suspend the intermediate panel between the front panel and the rear panel while being permeable to the passage of inflation gases.

4. The knee airbag of claim 2, wherein the transition construction in first and second transition areas includes threads in the weft direction and threads in the warp direction between the front and rear panels, the threads in the weft direction and the threads in the warp direction not interwoven with one another.

5. The knee airbag of claim 2, wherein the airbag is a OPW airbag and the first and second transition areas transition the knee airbag in first and second lateral directions from the laterally central area to the first and second lateral sides, respectively, from the three-layer construction to the two-layer construction.

6. The knee airbag of claim 5, wherein the knee airbag incudes interwoven weft and warp threads in the laterally central area and the first and second two-layer areas along the first and second lateral sides, and includes weft threads and warp threads laterally between the laterally central area and the first and second two-layer areas along the first and second lateral sides that are not interwoven.

7. The knee airbag of claim 1, wherein the first and second two-layer areas at least substantially extend completely along the first and second lateral sides of the knee airbag.

8. The knee airbag of claim 1, wherein the three-layer construction in the laterally central area extends distally to a distal end of the knee airbag.

9. The knee airbag of claim 1, further comprising an inflator for inflating the knee airbag disposed in the inflation chamber at a proximal end of the knee airbag.

10. The knee airbag of claim 1, further comprising a further two-layer area at a proximal end of the knee airbag and a further transition area longitudinally between the further two-layer area and the laterally central area.

11. The knee airbag of claim 10, wherein the knee airbag includes first and second transition areas having weft threads and warp threads between the front and rear panels that are not interwoven with one another and the further transition area only includes warp threads between the front and rear panels.

12. An airbag comprising:
a first panel;
a second panel coupled to the first panel to define an inflation chamber;
a third panel between the first panel and the second panel and within the inflation chamber, the third panel connected to the first panel and the second panel at various locations between a proximal end and a distal end of the third panel to control an inflated configuration of the airbag,
wherein the airbag has a two-layer construction including only the first panel and the second panel in a depth direction, a three-layer construction including the first panel, the second panel, and the third panel in the depth direction, and a transition construction including the first panel, the second panel, and an air permeable portion in the depth direction, and
wherein the airbag includes the two-layer construction in at least first and second two-layer areas at least substantially extending along first and second lateral sides of the airbag, respectively, the airbag includes the three-layer construction in a laterally central area between the first and second lateral sides.

13. The airbag of claim 12, further comprising the transition construction in first and second transition areas laterally between the first two-layer area and the laterally central area and the second two-layer area and the laterally central area, respectively.

14. The airbag of claim 13, wherein the transition construction in first and second transition areas includes weft threads and waft threads between the first and second panels that are not interwoven together, thereby laterally suspending the intermediate panel between the first panel and the second panel while being permeable to the passage of inflation gases.

* * * * *